United States Patent [19]

Krueger

[11] 3,889,364

[45] June 17, 1975

[54] METHOD OF MAKING SOLDERED ELECTRICAL CONNECTIONS

[75] Inventor: Ekkehard Krueger, Munich, Germany

[73] Assignee: Siemens Aktiengesellschaft, Berlin & Munich, Germany

[22] Filed: June 4, 1973

[21] Appl. No.: 366,518

[30] Foreign Application Priority Data

June 2, 1972 Germany ........................... 2226958

[52] U.S. Cl. .................. 29/628; 29/502; 29/527.2; 29/629; 117/114 B; 174/94 R; 339/275 T

[51] Int. Cl. ........................................... H01r 43/02

[58] Field of Search .......... 29/527.2, 503, 629, 628, 29/502; 117/114 B; 339/275 T; 174/68.5, 94 R

[56] References Cited

UNITED STATES PATENTS

| | | | |
|---|---|---|---|
| 474,584 | 5/1892 | Tobey | 29/502 X |
| 2,421,047 | 5/1947 | Wolfson et al. | 29/502 X |
| 2,426,650 | 9/1947 | Sivian | 29/503 |
| 2,918,519 | 12/1959 | Drieves | 29/628 UX |
| 2,936,981 | 5/1960 | Aversten | 29/502 X |
| 3,119,172 | 1/1964 | Mazenko et al. | 29/628 |
| 3,324,231 | 6/1967 | Miller | 29/628 X |
| 3,519,982 | 7/1970 | White | 339/275 T |
| 3,561,084 | 2/1971 | Sims | 29/502 X |
| 3,566,465 | 3/1971 | Weiner | 29/628 |

*Primary Examiner*—C. W. Lanham
*Assistant Examiner*—D. C. Reiley, III
*Attorney, Agent, or Firm*—Hill, Gross, Simpson, Van Santen, Steadman, Chiara & Simpson

[57] ABSTRACT

An electrical conductor of relatively small cross section is provided with a loop at one end adapted to be dipped into a bath of molten solder, whereby a predetermined amount of solder adheres to the loop as a membrane, formed by capillary action. The conductor is thus provided with a known quantity of solder, so that the conductor may be soldered to a conductive element by application of a known quantity of heat, without requiring any additional solder to be supplied at the time of soldering. The solder membranes are formed continuously by an automatic process, and the conductors are soldered into fixed relation with conductive elements automatically by the application of heat and pressure from a soldering element.

14 Claims, 8 Drawing Figures

METHOD OF MAKING SOLDERED ELECTRICAL CONNECTIONS

BACKGROUND

1. Field of the Invention

The present invention relates to a method and apparatus for making electrical connections, and more particularly, to a method for soldering relatively small diameter wires.

2. The Prior Art

In the construction and assembly of small electrical components, such as those, for example, having ceramic substrates, the connecting parts are conventionally first tinned, and then soldered together by the application of soldering heat, applying an additional quantity of solder to the connection at the time of soldering. Typically, the additional solder required during the soldering process is supplied by manually holding a solder wire in the vicinity of the connection; so that the additional solder melts from the wire and helps to form the connection. This method, however, does not allow for any precision in the supplying of a predetermined quantity of solder to the connection, and so frequently too little or too much solder is supplied. When too little solder is supplied, a poor connection results, and when too much solder is applied, the excess solder represents unnecessary waste, and also sometimes results in damage due to the drippings of the excess quantities of solder.

It has been suggested that the precise amount of solder which is needed could be supplied separately by placing a premeasured quantity of solder in the proximity of the connection when the soldering step is being performed. The practice of such a method, however, results in a great deal of complexity and apparatus in separately measuring the predetermined quantities and in making such quantities available at the connection sites.

SUMMARY OF THE PRESENT INVENTION

It is a principal object of the present invention to facilitate the task of soldering electrical conductors to conductive elements by a method which makes available the precise required quantity of solder for effecting each soldered connection.

Another object of the present invention is to provide a method and apparatus for making soldered connections which is relatively simple and inexpensive to perform, and which employs the precise required amount of solder for each connection.

A further object of the present invention is to provide a process for automatically soldering a plurality of conductors to predetermined connection points on one or more conductive elements.

Other objects and advantages of the present invention will become manifest upon an examination of the following description and the accompanying drawings.

In one embodiment of the present invention, there is provided a method of joining an electrical conductor to a conductive element comprising the steps of; forming a loop at an end of said conductor, exposing said loop to a bath of molten solder whereby said loop acquires a predetermined quantity of solder from said bath upon withdrawal of the same, juxtaposing said loop with a conductive element, and applying a predetermined quantity of heat to said loop to melt said solder and to form a soldered connection between said conductor and said element.

BRIEF DESCRIPTION OF THE DRAWINGS

Reference will now be made to the accompanying drawings in which:

Referring now to FIG. 1, a conductor 1 which is, for example, a wire having a diameter of 0.15 millimeters, has a loop 3 formed at one end thereof, the loop having a diameter D of approximately 0.8 millimeters. The loop 3 has been dipped into a molten bath of solder, so that a membrane of solder 4 has been formed by capillary action within the interior of loop 3. The amount of solder in the membrane 4 is determined by the capillary effect and is influenced by the diameter of the loop 3, and the characteristics of the solder. With the temperature of the solder bath remaining constant, the amount of solder which is picked up by exposing the loop 3 to a solder bath is determined exclusively by the diameter of the loop 3.

Figures 1, 2, 3, 4, 5, 6, 7, 8:
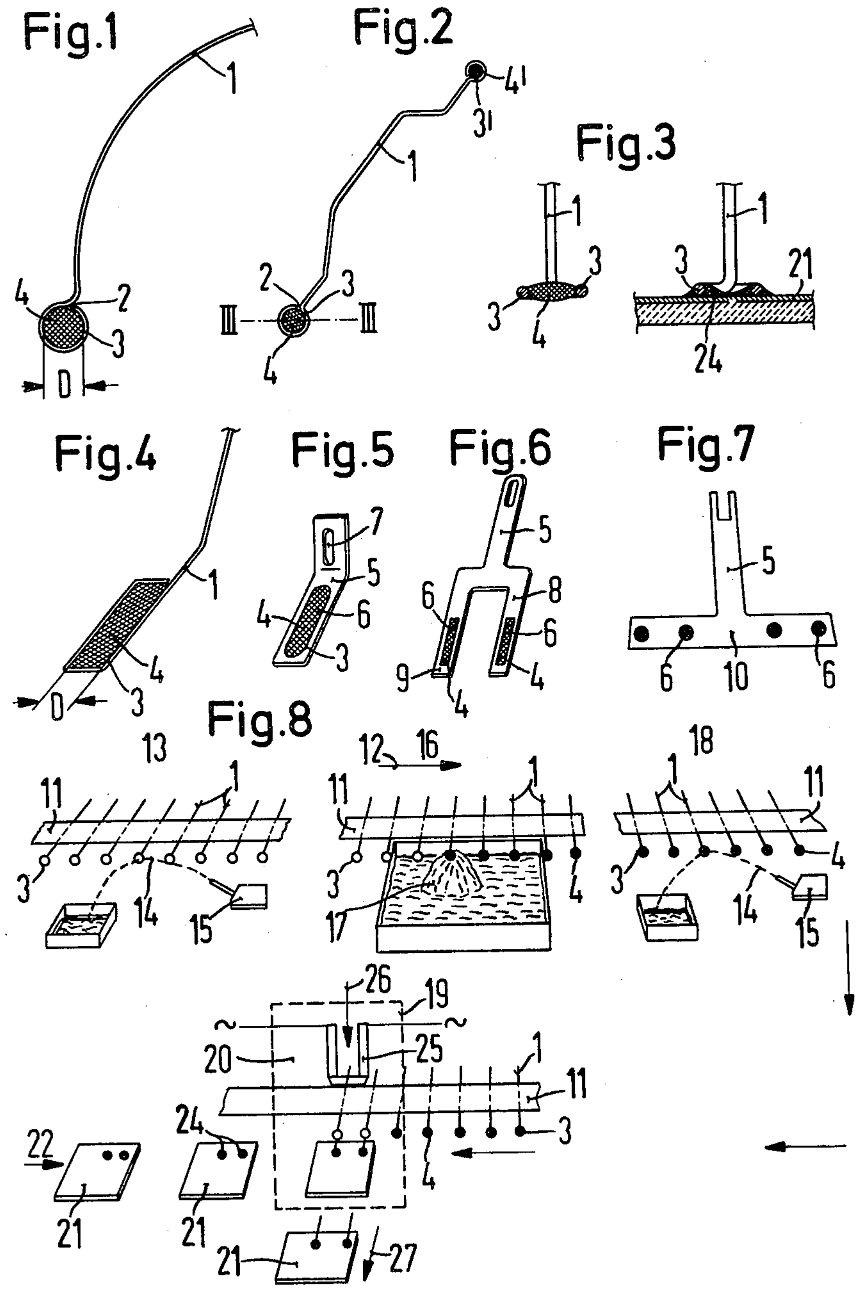
FIG. 1 is a view of a conductor having a loop for supporting a measured quantity of solder, in accordance with an illustrative embodiment of the present invention.
FIG. 2 is an illustration of a conductor having such a loop at each end.
FIG. 3 is a cross-sectional view showing a loop formed in accordance with an illustrative embodiment of the present invention before and after the conductor supporting it is soldered to a conductive element.
FIG. 4 is a perspective view of an alternative embodiment of the present invention.
FIG. 5 is a perspective view of another embodiment of the present invention.
FIG. 6 is a perspective view of a further embodiment of the present invention.
FIG. 7 is a plan view of yet another embodiment of the present invention.
FIG. 8 is a schematic illustration of a multi-step process illustrating the method and apparatus of another illustrative embodiment of the present invention.

When the loop 3 is removed from the solder bath, the solder membrane 4 solidifies. In this form, the solder membrane 4 is practically as durable as the conductor 1, and no special precautions must be taken in the handling of the conductor 1 on account of the membrane 4. The conductor 1 is electrically and mechanically connected with a conductive element by juxtaposing the membrane 4 with the element and then applying heat, causing the solder in the membrane 4 to melt and form a soldered connection between the conductor 1 and the conductive element to which it is attached.

FIG. 2 illustrates a conductor 1 having a loop formed at each end. The first loop 3 supports a membrane 4, and a second loop 3' supports a membrane 4'. The conductor 1 of FIG. 2 may be joined between two conductive elements by soldering the membrane 4 to one such element and the membrane 4' to the other element.

FIG. 3 illustrates a cross-sectional view of a loop 3 having a membrane 4 before and after being joined with a conductive element.

As shown in the left-hand portion of FIG. 3, the membrane 4 bulges slightly above and below the loop 3, so that its thickness at a central portion of the loop 3 exceeds the diameter of the conductor 1. This is especially advantageous in connection with automatic soldering, as the conductive element of which the wire 1 is to be joined is in direct contact with the lower surface of the solder membrane 4 during the soldering process. The right-hand portion of FIG. 3 illustrates a component 21 having a conductive element 24 to which the conductor 1 has been soldered by the application of heat to the membrane 4. It can be seen that the membrane 4 has collapsed, and the solder has been collected around the periphery of the loop 3, joining the loop 3 firmly to the conductive element 24.

FIG. 4 shows another form of loop applied to the end of a conductor 1. The loop of FIG. 4 is rectangular in shape. The smaller dimension D of the rectangle is important. Experience indicates that the smaller dimension D of the loop should not be greater than 1.2 millimeters when used with conductors 1 having diameters of less than 0.25 millimeters.

FIG. 5 illustrates an L-shaped conductor 5 formed of sheet metal and having a loop 3 in the form of a slot 6 provided in one leg thereof. A solder eyelet 7 of a conventional design is provided in the other leg of the conductor 5. The loop 3 of FIG. 5 is used in the same way as described above; namely, exposing the loop to a bath of molten solder in order to pick up a measured quantity of solder.

FIG. 6 shows a conductor having two conducting arms 8 and 9, each of which is provided with a slot 6 for picking up a measured quantity of solder to form a membrane 4, when exposed to a bath of molten solder.

FIG. 7 shows another form of conductor, which has a cross strap 10 supporting four apertures 6 therein. The apertures 6 serve the same function as the loops 3 described above and are adapted to pick up and hold a measured amount of solder in the form of membranes 4 closing the apertures when the cross strap 10 is exposed to the solder bath.

FIG. 8 illustrates a continuous process employing conductors of the type illustrated in FIG. 1, although any of the various forms of conductors of FIGS. 2–7 may be employed. A plurality of the conductors 1 are held together in spaced-apart parallel relationship by means of a band 11 and are transported in the longitudinal direction of the band 11 as the band is pulled by a transport means (not shown). As the conductors 1 are thus transported, in the direction of the arrow 12, they pass through a series of stations at which successive steps of the process are performed. At a first station 13, the loops 3 are provided with a coating of soldering flux, which is preferably rosin. The liquid rosin is sprayed onto the loops 1, by means of a sprayer 15, through a path 14 which intersects with the path of the moving loops 3. The rosin which does not coat the loops 3 is collected in a receiving pan so that it may be reused.

The next step of the process occurs at station 16, where the moving loops 3 pass into and through a upwardly directed spray 17 of molten solder, provided by a nozzle or the like (not shown). The solder applied to the loops 3 forms a membrane 4 in each of the loops, and the solder which is not used to form membranes is collected in a receiving pan to be reused.

The loops 3, each carrying a membrane 4, then pass through a station 18, at which the membranes are coated with a layer of rosin 14, just as in the step which occurred at station 13. The conductors 1, with their loops 3, are then drawn by further movement of the band 11 to a station 19 at which they are soldered to connection points 24, which represent conductive elements supported on a plurality of ceramic substrate elements 21. The separate ceramic elements 21 are moved by transport means (not shown) in the direction of the arrow 22, so that they arrive in successive fashion at the station 19, at the same time as the conductors 1 arrive at the station 19. When the loops 3 of the conductors 1 come into correct position relative to the contacting points 24, they are soldered thereto by means of heat applied to the membranes 4 by a heating element 25. The heating element 25 is lowered into contact with the loops 3 and/or the membranes 4, as indicated by the arrow 26, and forces the lower portion of the membrane 4 against the upper portion of the contact points 24 with a predetermined pressure. Electrical current is then conducted through the soldering element 25 to heat the same, so that a predetermined quantity of heat is applied by the soldering element 25 to the membranes 24 to melt the same and cause the solder to form a firm mechanical and electrical connection. The soldering element 25 is then withdrawn upwardly to its original position, and the solder is allowed to cool. Cooling of the solder is facilitated by an air stream (not shown) directed at the contact points 24.

The substrate elements 21 are the moved in the direction indicated by the arrow 27, transverse to the longitudinal direction of the band 11. In this way, the conductors 1 are drawn from the band 11, as the ceramic element 21 are conveyed away from the station 19.

As described above, the present invention furnishes a predetermined amount of solder for the purpose of soldering each conductor 1 to a contact point 24. Good electrical and mechanical contact is thus assured, without wasting any solder, and without risking damage due to dripping of excess quantities of solder. It is not necessary to apply additional solder to the joint at the time of soldering. Automatic connection of electrical components and assemblies is thus accelerated and simplified considerably. In addition, the relative height of each of the solder connections is constant for all of the solder connections which are formed in accordance with the present invention, since the same quantity of solder is employed for each of the connections and each connection has the same physical dimensions.

The present invention is suitable for use with wires carrying an insulating layer of lacquer or the like, provided the lacquer is melted from the wire either by the rosin 14 applied at the station 13 or by the molten solder bath 17 applied at station 16. In this way, only the lacquer in the vicinity of the loops 3 is removed, so that the rest of the conductor remains coated with lacquer, which accordingly continues to perform its insulating function.

Although the embodiments described above have incorporated closed loops for supporting the membrances 4, it will be appreciated by those skilled in the art that the loops may instead take the form of forks or fork-shaped slots. The loops 3 must be closed; otherwise no closed solder membrane and equal solder amounts must be produced. The closed loop shape has been found to be more advantageous, as it has a higher mechanical stability.

What is claimed is:

1. A method of metering solder for use in a soldered connection between an electrical conductor and a conductive element, comprising the steps of: forming a loop of capillary size in said conductor, exposing said loop to a bath of molten solder, withdrawing said loop from said bath and permitting the solder acquired by said loop to solidify, whereby a predetermined amount of solder is acquired by said loop by capillary action, said solder solidifying into a membrane closing said loop.

2. The method according to claim 1, including the step of forming said loop with a diameter corresponding to the amount of solder desired for making said connection.

3. The method according to claim 1, including the step of providing a coating of soldering flux on said loop before exposing said loop to said solder bath.

4. The method according to claim 1, including the step of providing a coating of soldering flux on said loop after exposing said loop to said solder bath.

5. The method according to claim 1, wherein said conductor 1 is a closed loop.

6. The method according to claim 1, wherein said conductor is a wire and said loop is formed by bending said wire.

7. The method according to claim 1, wherein said conductor is a piece of sheet material, and said loop is formed by deforming said sheet material.

8. The method according to claim 7, wherein said deforming step comprises forming an aperture in said sheet material.

9. A method of making a soldered connection between an electrical conductor and a conductive element, comprising the steps of; forming a loop of capillary size in said conductor, exposing said loop to a bath of molten solder, whereby a predetermined amount of solder is acquired by said loop by capillary action and solidified into a membrane closing said loop, juxtaposing said loop with said conductive element, and applying heat to said membrane to melt said solder and allow said solder to form said connection.

10. The method according to claim 9, wherein said conductor is a wire and including the steps of; forming said loop by bending said wire in a loop, said membrane having a central portion projecting downwardly beyond the wire of which said loop is formed, and placing the lower surface of said membrane in contact with said conductive element prior to said heating step.

11. The method according to claim 9, including the steps of; temporarily supporting a plurality of said conductors in spaced-apart relation, and conveying said conductors while so supported toward a plurality of conductive elements for soldering thereto.

12. The method according to claim 11, including the step of moving each of said conductive elements away from said plurality of conductors after it has been soldered to one of said conductors.

13. The method according to claim 12, wherein said conductors are elongate bodies, and said supporting step comprises supporting said bodies in spaced locations along the length of a band, said bodies being restrained from movement relative to said band except in their longitudinal direction, and including the step of withdrawing said bodies from said band as said conductive elements are moved away.

14. The method according to claim 9, including the steps of; pressing said loop against said conductive element with a predetermined force by a heating element, heating said heating element by passing an electrical current therethrough to produce a predetermined quantity of heat for melting said solder, and removing said heating element from said loop after said heating step.

* * * * *